(12) United States Patent
Barrila'

(10) Patent No.: US 9,423,040 B2
(45) Date of Patent: Aug. 23, 2016

(54) FIRE PROTECTION DELUGE MEMBRANE VALVE WITH MULTIPLE CLOSING APERTURES

(71) Applicant: Valeriano Barrila', Messina (IT)

(72) Inventor: Valeriano Barrila', Messina (IT)

(73) Assignee: SA FIRE PROTECTION S.R.L., Saponara Maritima (Messina) (IT)

( * ) Notice: Subject to any disclaimer, the term of this patent is extended or adjusted under 35 U.S.C. 154(b) by 68 days.

(21) Appl. No.: 14/376,808

(22) PCT Filed: Feb. 5, 2013

(86) PCT No.: PCT/EP2013/000346
§ 371 (c)(1),
(2) Date: Aug. 5, 2014

(87) PCT Pub. No.: WO2013/117322
PCT Pub. Date: Aug. 15, 2013

(65) Prior Publication Data
US 2015/0096629 A1   Apr. 9, 2015

(30) Foreign Application Priority Data
Feb. 7, 2012   (IT) .............................. UD2012A0019

(51) Int. Cl.
| F16L 43/00 | (2006.01) |
| F16K 11/22 | (2006.01) |
| F16K 7/12 | (2006.01) |
| F16K 43/00 | (2006.01) |
| F16K 1/20 | (2006.01) |
| A62C 35/68 | (2006.01) |
| F16K 31/126 | (2006.01) |

(Continued)

(52) U.S. Cl.
CPC .................. *F16K 11/22* (2013.01); *A62C 35/68* (2013.01); *F16K 1/2021* (2013.01); *F16K 7/12* (2013.01); *F16K 7/126* (2013.01); *F16K 31/1268* (2013.01); *F16K 35/06* (2013.01);*F16K 35/10* (2013.01); *F16K 35/14* (2013.01); *F16K 43/003* (2013.01); *Y10T 137/7256* (2015.04); *Y10T 137/87322* (2015.04)

(58) Field of Classification Search
CPC .... Y10T 137/87434; F16K 7/126; F02D 9/18
USPC ................. 251/287, 9, 289; 137/511, 516.19, 137/614.17, 614.13, 599.01, 601.01
See application file for complete search history.

(56) References Cited

U.S. PATENT DOCUMENTS 2,907,346 A * 10/1959 Fortune ................... F16K 7/126
                                                       137/601.04
3,913,603 A * 10/1975 Torres .................... B64D 37/32
                                                       137/614

(Continued)

FOREIGN PATENT DOCUMENTS

WO        9913251 A1   3/1999
WO     2006046942 A1   5/2006

OTHER PUBLICATIONS

International Search Report for corresponding International Application No. PCT/EP2013/000346.

*Primary Examiner* — Craig Schneider
*Assistant Examiner* — Angelisa L Hicks
(74) *Attorney, Agent, or Firm* — Egbert Law Offices, PLLC

(57) ABSTRACT

Valve of the type having a body which is provided with an inlet and an outlet of a fluid which are reciprocally put in flow communication by means of a communication chamber in which said communication chamber can be occluded by means of closure means and in which the communication chamber is divided in a first chamber and a second chamber, each putting in flow communication the inlet and the outlet of the fluid according to a parallel configuration. The first chamber is provided with first closing means, the second chamber is provided with second closing means and there is further provided at least one third closing means.

19 Claims, 6 Drawing Sheets

(51) Int. Cl.
*F16K 35/06* (2006.01)
*F16K 35/10* (2006.01)
*F16K 35/14* (2006.01)

(56) References Cited

U.S. PATENT DOCUMENTS

| | | | | |
|---|---|---|---|---|
| 5,102,228 A | * | 4/1992 | Vine-Lott | B01F 3/04992 137/599.04 |
| 5,427,150 A | | 6/1995 | Skaer et al. | |
| 5,611,204 A | * | 3/1997 | Radovanovic | F02M 25/0722 123/574 |
| 6,032,690 A | * | 3/2000 | Weissfloch | F16K 7/126 137/599.08 |
| 6,053,191 A | * | 4/2000 | Hussey | F16K 7/075 137/15.18 |
| 2005/0138923 A1 | * | 6/2005 | Tamura | F01N 3/2006 60/324 |
| 2010/0071776 A1 | * | 3/2010 | Ringer | F16K 7/126 137/12 |

\* cited by examiner

FIRE PROTECTION DELUGE MEMBRANE VALVE WITH MULTIPLE CLOSING APERTURES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a valve according to the characteristics of the pre-characterizing part of claim 1.

The present invention also relates to a distribution system of a fluid.

The present invention relates also to a fire extinguishing system by distribution of a fluid.

2. Description of Related Art Including Information Disclosed Under 37 CFR 1.97 and 37 CFR 1.98.

In the field of the production of the valves in general and in particular of the deluge valves for fire extinguishing systems by distribution of a fluid, the membrane valves in which a membrane, or anyway closing means, are operable to open or close the flow communication between a fluid inlet and a fluid outlet of the valve itself in order to put in communication a water delivery with the distribution system of the same which is then provided with water spraying nozzles for the extinguishing of a possible fire, for example and without limits for the purpose of the valve application according to the present invention, within a building or the like.

Patent WO 99/13251 describes a membrane valve whose body has two chambers provided with a seat for a closing diaphragm, a central channel for each chamber that is provided with an outside connection, a first side channel and a second side channel interconnected and provided with a common connection with the outside, in which the valve is provided with control means which are arranged to press portions of the membranes against the respective seats in order to close the passage between a central channel and a side channel and in order to open the passage between a central channel and a side channel.

Patent WO 2006/046942 describes a multiple function integrated valve which is a valve in which more types of valves are integrated within a casing that is maintained permanently on line, the valve in its whole being able to carry out the valve on-off function, pressure relief valve, pressure limiter valve, check valve, deviation valve of the fluid flow in different directions.

U.S. Pat. No. 5,427,150 describes a diaphragm valve having a body with triangular section which is provided with accesses that open on internal contiguous cubicles within the body itself.

Problems of Prior Art

The systems including prior art valves, and particularly the deluge valves for fire extinguishing systems, are subject to particular contrives directed to ensure a high safety and reliability level. Particularly relevant are the contrives adopted to prevent the malfunctions of the power plant for the activation of the fire extinguishing system and of the valves trim lines for the valves control supplying SIL components having degree raising on the basis of the desired reliability level. However in the systems including valves of prior art, and particularly the deluge valves for fire extinguishing systems, the same attention is not given to the reliability of the valve itself, which can however result subject to locking, in particular, in the case of membrane valves, because of the sticking of the membrane to the valve walls. This condition endangers the total efficiency of the system and can reduce the water delivery or absolutely prevent its flow towards the distribution system.

Furthermore, also due to the aspects and problems just explained, periodically carrying out the maintenance on the valves, operation that, in case of the membrane valves, involves the opening of the valve body for the inspection and possible replacement of the membrane itself is necessary. During such maintenance operations the fire extinguishing system must be necessarily disabled, at least as to the portion that is object of the maintenance. This need of the system disabling during the maintenance operations has as a result the presence of high risks during the maintenance operations that, in case would result concomitant with a fire, could even compromise the functionality of the same extinguishing system.

Purpose of the Invention

The purpose of this invention is to supply a valve, particularly a diaphragm valve for fire extinguishing systems, that results as having a greater reliability level than the valves of prior art.

BRIEF SUMMARY OF THE INVENTION

The purpose is reached with the characteristics of the main claim. The sub-claims represent advantageous solutions.

Advantageous Effects of the Invention

The solution according to the present invention, by the considerable creative contribution whose effect constitutes an immediate and important technical progress, presents various advantages.

In addition to the greater reliability obtainable by means of the valve according to the present invention, it also allows to facilitate considerably the maintenance operations of the system.

Furthermore the valve according to the present invention also allows to operate the maintenance necessary to the valve itself at the same time maintaining active the system served by the valve, without making necessary its disabling or the disabling of a branch or of a part of the same during the maintenance operations.

BRIEF DESCRIPTION OF THE DRAWINGS

In the following a solution is described with reference to the included drawings to be considered as non-exhaustive example of the present invention in which.

DETAILED DESCRIPTION OF THE INVENTION

During the present description reference will be made particularly to a valve to be applied as deluge valve for fire extinguishing systems and, more in detail, to a valve of the membrane type. However the valve according to the present invention must not be considered as limited to this particular application and forms of execution, which have explicative purpose.

The valve according to the present invention and in particular in its application as deluge valve for fire extinguishing systems, originates from the will to increase the functional safety of the deluge protection system also in its mechanical part, that, usually, is neglected because most attention is put on the electrical part of the system itself, supplying SIL components with a degree raising on the basis of the desired reliability level, but not considering however the possibility of malfunction of the deluge valve or the trim line that operates the same valve. We thus arrived to the paradox of being able to install level SIL 4 solenoid electrical actuators on deluge valves and related trim lines that are unable to give any guarantee from the functional safety point of view.

The valve and in particular the deluge valve according to the present invention aims at ensuring a suitable reliability level of the whole deluge protection system, both of the electrical and of the mechanical part, improving the reliability of the valve itself.

Figure 1:
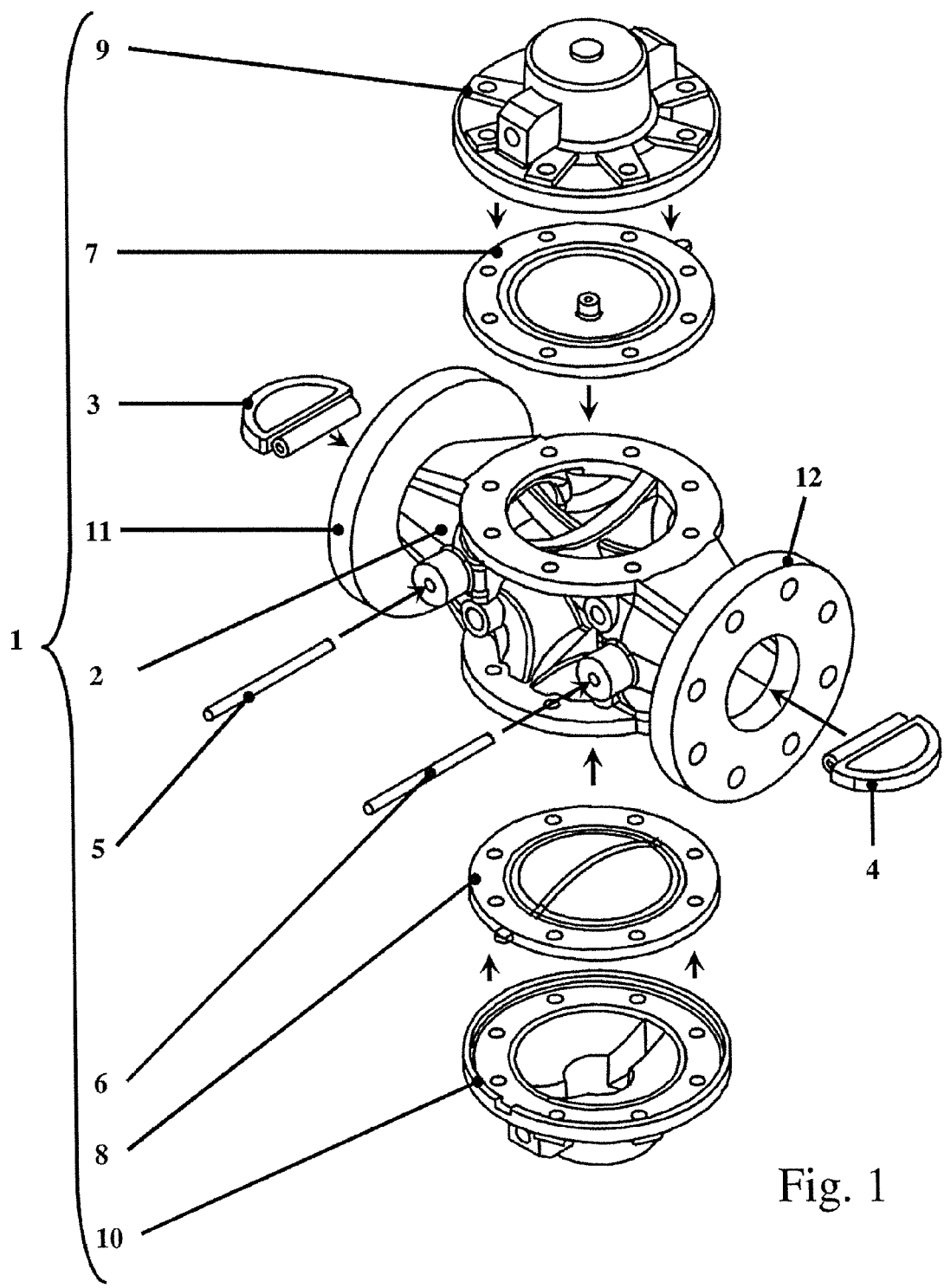
FIG. 1 represents an exploded three-dimensional schematic view of the valve made in conformity with this invention.
Figure 2:
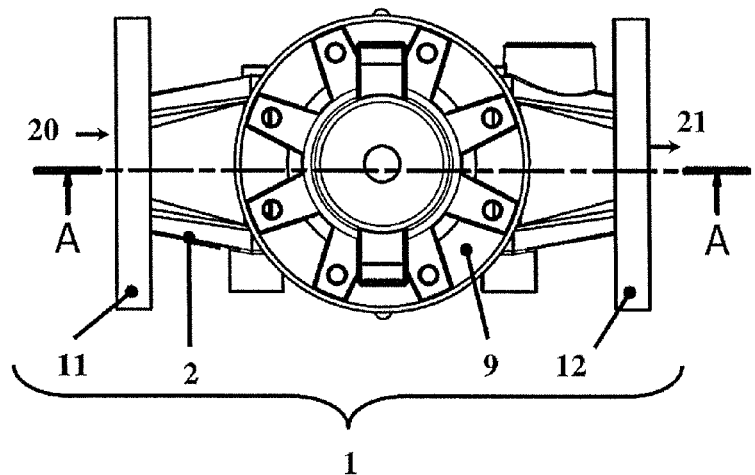
FIG. 2 represents a schematic view in plan of the valve of FIG. 1.
Figure 3:
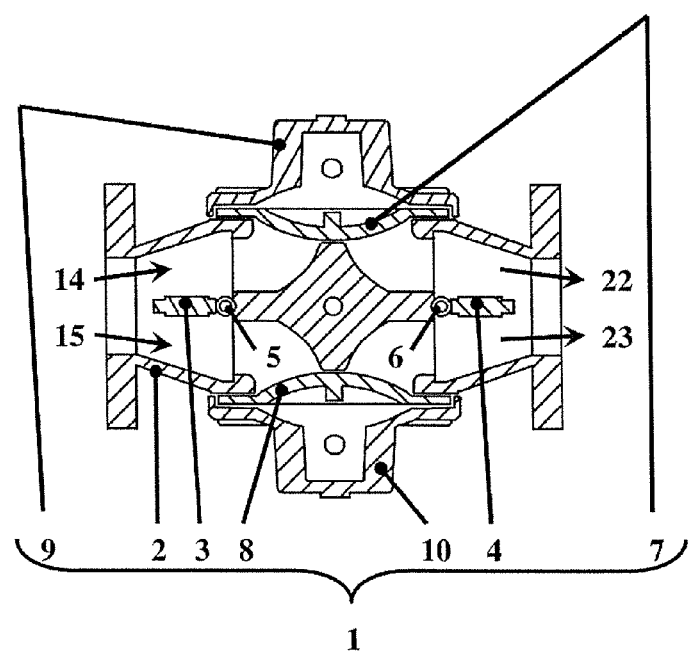
FIG. 3 represents a schematic view in section of the valve made in conformity with the present invention according to the section line A-A of FIG. 2.
Figure 6:
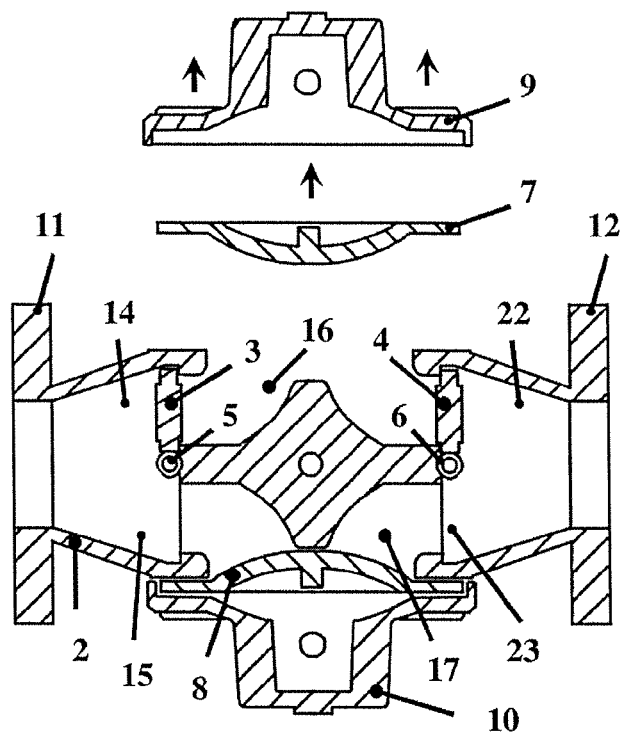
FIG. 6 represents a schematic view in section of the valve of FIG. 3 showing a maintenance condition.
Figure 7:
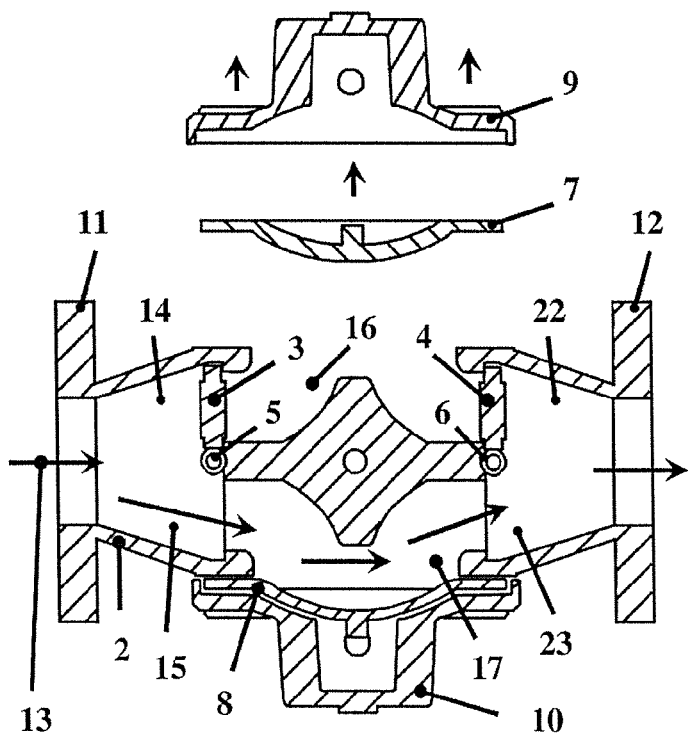
FIG. 7 represents a schematic view in section of the valve of FIG. 6 showing a maintenance condition in which is shown also the maintenance in active condition of the system served from the same valve.
Figure 8:
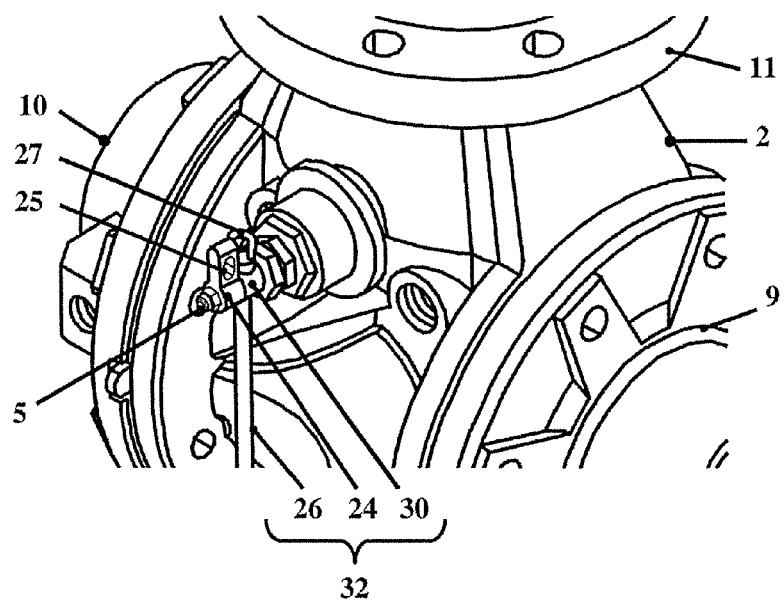
FIG. 8 represents a three-dimensional view showing the safety blocking system of the valve made in conformity with this invention in a first blocking position.
Figure 9:
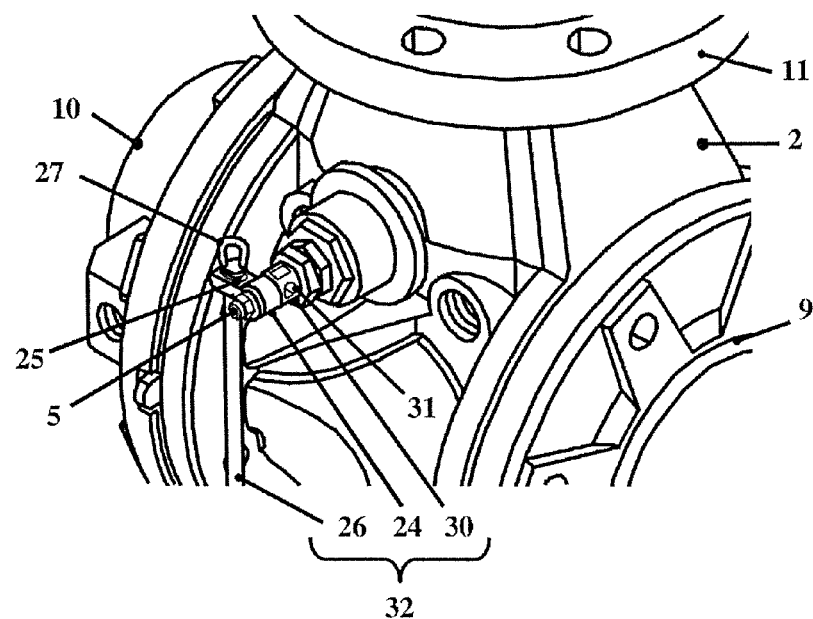
FIG. 9 represents a three-dimensional view showing the safety blocking system of the valve made in conformity with this invention in a second blocking position.

The valve (1) according to the present invention (FIG. 1, FIG. 2, FIG. 3) is of the type comprising a body (2) which is provided with an inlet (20) of a fluid (13) and an outlet (21) of the same fluid, preferably made in correspondence with a first flange (11) and a second flange (12) for the connection to the upstream and downstream pipes of the same valve. The inlet (20) and the outlet (21) of the fluid are reciprocally put in flow communication by means of a communication chamber in which the communication chamber can be occluded by means of closure means of the flow communication which are operable by means of a control and is characterized in that the communication chamber is divided (FIG. 6, FIG. 7) in a first chamber (16) and a second chamber (17). Each of the first chamber (16) and second chamber (17) puts in flow communication the inlet (20) and the outlet (21) of the fluid (13) according to a parallel configuration in which:

the first chamber (16) is connected to the inlet (20) by means of a first entry branch (14);
the first chamber (16) is connected to the outlet (21) by means of a first exit (branch 22);
the second chamber (17) is connected to the inlet (20) by means of a second entry branch (15);
the second chamber (17) is connected to the outlet (21) by means of a second exit branch (23).

Moreover in the valve (1) according to the present invention, both the first chamber (16) and the second chamber (17) are provided with corresponding closure means of the flow communication. In practice the first chamber (16) is provided with corresponding first own closing means (7) of the flow communication which are operable by means of a control and the second chamber (17) is itself provided with own corresponding second closing means (8) of the flow communication which are operable by means of a control. In the form of execution shown the valve (1) is configured and structured as a deluge valve for fire extinguishing system, in which the fluid is a fire extinguishing liquid. In the form of shown execution, moreover, the closing means are made in the form of a deformable elastic membrane.

It will however be evident that in other embodiments the closing means can assume also other configurations that will be immediately evident to those skilled in the art of the sector. It is necessary therefore to specify that the present invention is not limited to the shown specific case of closing means made in form of membrane, but it is applicable, with changes that will be immediately evident to those skilled in the art of the sector in view of the present description, also in the case of closing means (7,8) as an example and not to a limited degree selected from the group consisting of piston, head or clapet, throttle, sluice, shutter.

Figure 4:
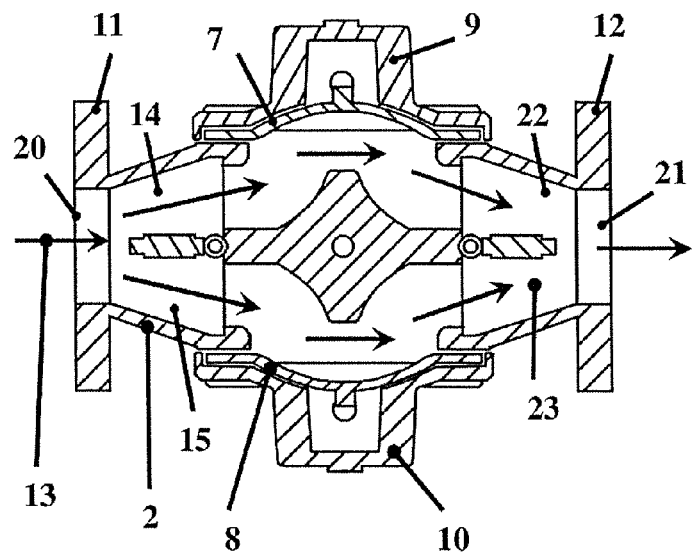
FIG. 4 represents a schematic view in section of the valve of FIG. 3 showing a first working condition.

The elastic membrane is deformable by means of a control by application of a pressure in correspondence with at least one side of said membrane. The application of the pressure at the opposite side with respect to the side of the chamber within which occurs the fluid flow causes the deformation of the membrane bringing it in an adherence condition (FIG. 3) of the membrane itself with the inside wall of the corresponding chamber (16,17) closing the flow communication of the chamber. The removal of the applied pressure (FIG. 4) causes the return of the membrane in a not adhering condition of the membrane itself with the inside wall of the corresponding chamber (16,17) opening the flow communication of the chamber. The return of the membrane occurs due to the elastic return force of the membrane itself and/or due to the force applied by the fluid that is pressurized and contributes to complete the opening of the chamber exerting a pushing force on the membrane itself. The application of the deformation force of the membrane to bring it in adherence condition with the walls of the chamber and to block the fluid flow, occurs by means of trim lines that maintain the membrane close-fitting to the inside wall of the valve, determining the closure of the chamber. At the moment of detecting a fire start, a control signal, that may be of the electrical, pneumatic or hydraulic type, determines the outflow of water or gas contained in the trim line. On the lacking of the hydraulic pressure, the membrane starts to part from the wall of the valve and the water flow of the main supply line starts to flow through the chamber. After a short transitory flow the mainline determines the complete opening of the chamber of the valve, feeding the extinguishing system.

Figure 5:
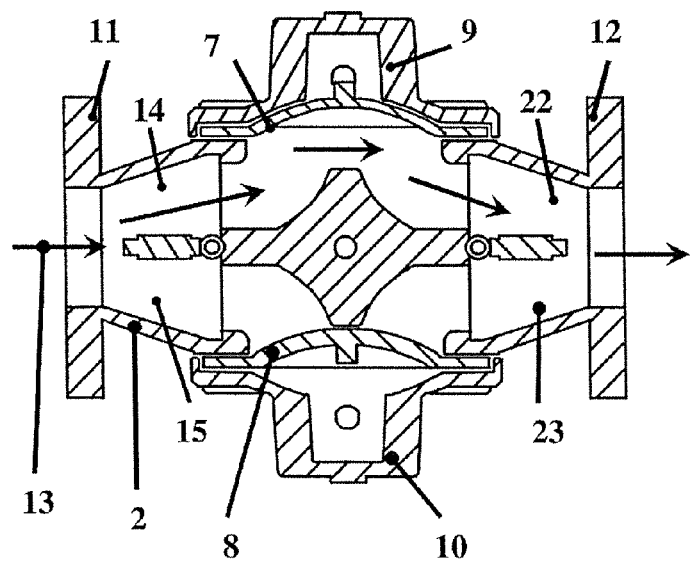
FIG. 5 represents a schematic view in section of the valve of FIG. 3 showing a second working condition.

The main characteristic of the valve according to the present invention is to encompass in a single valve body (FIG. 5, FIG. 6, FIG. 7) two different chambers (16,17), each provided with its own membrane (7,8) and with a dedicated trim line. The system is in this way completely redundant. In fact it is possible to apply two different control signals that are sent to the two trim lines, causing the opening of the two chambers. The two chambers are therefore, able to operate in complete autonomy one from the other. In case of malfunction of one of the two membranes, for example because of adhering to the inside wall, the opening of the other chamber allows the passage of the water flow necessary to feed the extinguishing system.

In general, therefore, the valve (1) according to the present invention includes a first control and a second control independent from one another that are controlled by means of corresponding operating devices working in parallel simultaneously on the first control and on the second control. Preferably, particularly in the case of deluge valves provided with a membrane, the first control and said second control are respectively a first trim line and a second trim line of a fire extinguishing system applying the deformation pressure of the membrane.

Another fundamental characteristic of the valve according to the present invention is that it makes possible the hydraulic connection between the two trim lines operating respectively as first control and second control: such connection allows to each trim line to determine the opening (FIG. 4) of both chambers (16,17) of the valve (1). In fact in case of failure of one of the two control signals, the opening of the other trim and the hydraulic connection between the two lines allow the water outflow from both trim lines and the consequent opening of both chambers. A similar speech can be made also upon failure of one of the trim lines, due for example to the obstructing of a pipe portion. Also in this case is obviated to the failed arrival of the opening control on one of the two trim lines that lead to the valve (1) by the presence of the connection between the two trim lines that, in this way, allow however the opening of both chambers.

As much shown above the valve (1) according to the present invention, particularly in the case of double chamber deluge valve complete with two hydraulically connected trim lines, is a system able to provide to a double failure.

A similar result cannot be simply obtained by installing in parallel two traditional deluge valves, unless a suitable hydraulic connecting system between the two trim lines of the two valves is designed on site.

Another fundamental advantage of the valve according to the present invention is that it is possible to carry out the maintenance of the body (2) of the valve (1) or the trim lines maintaining in operation the deluge protection system, thus incrementing the functional safety requirements of the device.

In fact the valve (1) according to the present invention includes at least one third closing means (3,4) operable on command able to selectively close at least one between first entry branch (14), first exit branch (22), second entry branch (15), second exit branch (23).

For example one of such third closing means operable by means of a control can be configured and structured in the form (FIG. 1, FIG. 3) of a first closing tab (3) hinged at a first hinging point (5). The first closing tab (3) is movable by means of a control between at least two positions of which a first position (FIG. 6) in which the first closing tab (3) closes the first entry branch (14) keeping opened the second entry branch (15) and a second position (not represented but absolutely symmetrical compared to the case of FIG. 6) in which the first closing tab (3) closes the second entry branch (15) keeping opened the first entry branch (14). Preferably the first closing tab (3) is movable by means of a control in between three positions of which a first position in which (FIG. 6) the first closing tab (3) closes the first entry branch (14) keeping opened the second entry branch (15), a second position in which the first closing tab (3) closes the second entry branch (15) keeping opened the first entry branch (14), a third position (FIG. 3, FIG. 4, FIG. 5) in which the first closing tab (3) keeps opened simultaneously the first entry branch (14) and the second entry branch (15). Preferably the first hinging point (5) is obtained on the body (2) of the valve (1) in between the first chamber (16) and the second chamber (17) and in between the first entry branch (14) and the second entry branch (15). The first closing tab (3) is provided with an insertion through-hole of a first pin (5) that constitutes the first hinging point around which the first closing tab (3) can rotate by means of a control.

In similar way, one of such third closing means which is operable by means of a control can be configured and structured in the form (FIG. 1, FIG. 3) of a second closing tab (4) hinged at a second hinging point (6). The second closing tab (4) is movable by means of a control between at least two positions of which a first position in which (FIG. 6) the second closing tab (4) closes the first exit branch (22) keeping opened the second exit branch (23) and a second position (not represented but absolutely symmetrical compared to the case of FIG. 6) in which the second closing tab (4) closes the second exit branch (23) keeping opened the first exit branch (22). Preferably the second closing tab (4) is movable by means of a control between three positions of which a first position in which the second closing tab (4) closes (FIG. 6) the first exit branch (22) keeping opened the second exit branch (23), a second position in which the second closing tab (4) closes the second exit branch (23) keeping opened the first exit branch (22), a third position in which (FIG. 3) the second closing tab (4) keeps opened simultaneously the first exit branch (22) and the second exit branch (23). Preferably the second hinging point (6) is obtained on the body (2) of the valve (1) in between the first chamber (16) and the second chamber (17) and in between the first exit branch (22) and the second exit branch (23). The second closing tab (4) is provided with an insertion through-hole of a second pin (6) constituting the second hinging point around which the second closing tab (4) can be rotated by means of a control.

In the preferred solution of the present invention the valve (1) includes two of these said third closing means (3,4) which are operable by means of a control:
- one of these two third closing means (3) intended to selectively close one between first entry branch (14) and second entry branch (15);
- the other of these two third closing means (4) intended to selectively close one between first exit branch (22) and second exit branch (23).

The contemporary closure of first entry branch (14) and first exit branch (22) by means of said two third closing means (3,4) causes (FIG. 6), therefore, the insulation of the first chamber (16) with respect to the flow communication between inlet (20) and outlet (21) that is obtained by means of the second chamber (17). The contemporary closure of second entry branch (15) and second exit branch (23) by means of these two third closing means (3,4) causes the insulation of the second chamber (17) with respect to the flow communication between inlet (20) and outlet (21) that is obtained for means of the first chamber (16).

Therefore, in the preferred solution of the present invention, the body (2) of the valve (1) is provided with two semi-cylindrical tabs (3,4), one in entry and the other in exit with respect to the valve. In condition of normal operation the two tabs are (FIG. 4) in longitudinal position with respect to the axis of the valve (1). Preferably the movement control of the tabs occurs by means of a special burglar-resistant operating key supplied together with the valve (1) that allows the 90° rotation of the two tabs, insulating the chamber of the valve subjected to maintenance. The use of a special dedicated key precludes that the tabs may be operated by people other than service personnel that own the same key. Moreover closing down a special valve on the hydraulic connection line between the two trim lines it is possible to separate completely the two halves of the system. At this point proceeding (FIG. 6, FIG. 7) with the routine or extraordinary maintenance of the membrane (7) and the trim line of the insulated half, keeping the system in operation by means of the other chamber (17) and the other trim line, thus continuing to ensure the protection of the fittings is possible. For example removing the first closure (9) to have access to the first chamber (16) and to the first membrane (7) while the second chamber (17) is operative and in similar way removing the second closure (10) to have access to the second chamber (17) and to the second membrane (8) while the first chamber (16) is operative is possible.

Alternatively to the security system that provides the use of a special burglar-resistant key, in general, the valve (1) according to the present invention can include (FIG. 8, FIG. 9, FIG. 10, FIG. 11, FIG. 12) blocking means (32) intended to selectively block the third closing means (3,4) in one of the conditions corresponding to contemporary closure of first entry branch (14) and first exit branch (22), or contemporary closure of second entry branch (15) and second exit branch (23) or contemporary opening of first entry branch (14) and first exit branch (22) and second entry branch (15) and second exit branch (23).

Figure 10:
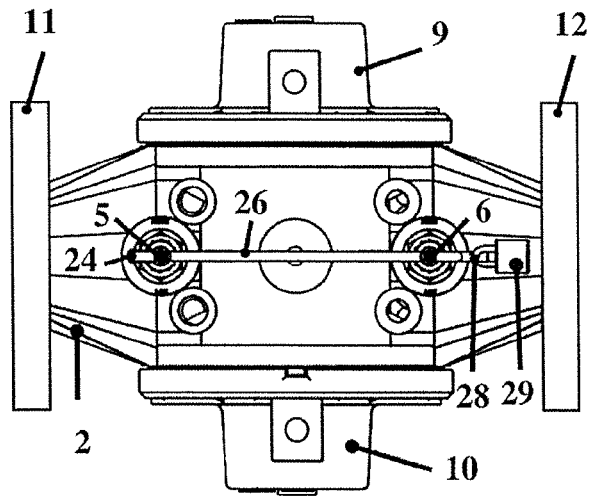
FIG. 10 represents a plan view showing the safety blocking system of the valve made in conformity with this invention in a first blocking position.
Figure 11:
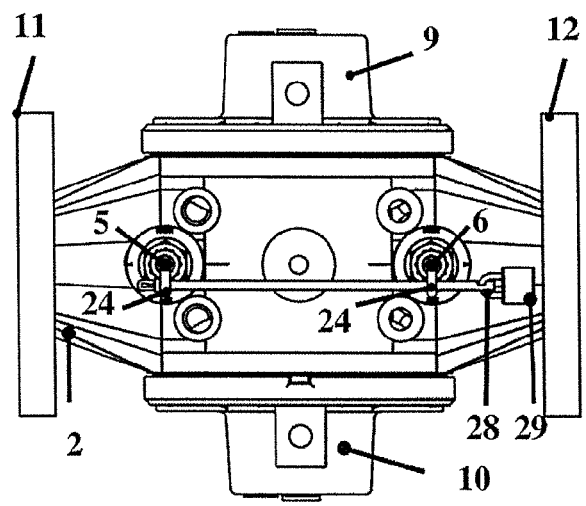
FIG. 11 represents a plan view showing the safety blocking system of the valve made in conformity with this invention in a second blocking position.
Figure 12:
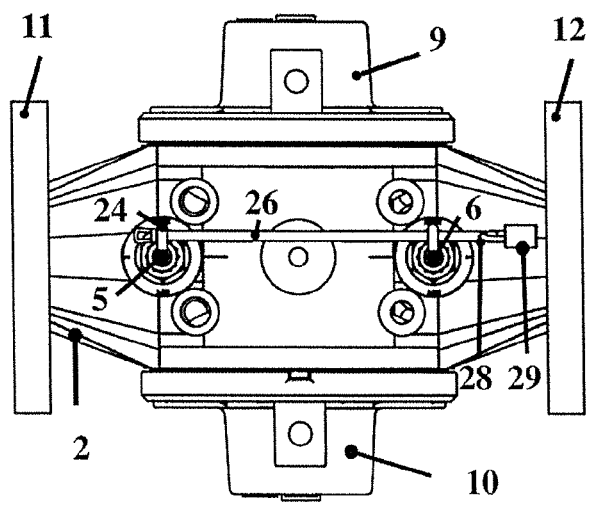
FIG. 12 represents a plan view showing the safety blocking system of the valve made in conformity with this invention in a third blocking position.

For example in a form of embodiment (FIG. 8, FIG. 9, FIG. 10, FIG. 11, FIG. 12), the valve (1) includes blocking means (32) that consist of two first elements (24) and two second elements (30) that plug on the first pin (5) and on the second pin (6) by means of which the positioning of the tabs or anyway, in general, of the third closing means (3,4) is controlled. One of these first elements (24) and one of these second elements (30) are plugged on the first pin (5) in correspondence with the insertion through-hole of the pin itself. In similar way one of these first elements (24) and one of these second elements (30) are plugged on the second pin (6) in correspondence with the insertion through-hole of the pin itself. The first element (24) and the second element (30) are protruded outside with respect to the body (2) of the valve (1) in way to be completely accessible (FIG. 8, FIG. 9) from outside. Each pair consisting of one of these first elements (24) and one of these second elements (30) is constrained to rotate jointly with the respective pin (5,6) and jointly with the corresponding closing tab (3,4). In practice each closing tab can be constrained to rotate by the rotation of the respective hinging pin and the end of the hinging pin that protrudes outside with respect to the body (2) of the valve (1) is provided with the elements that are in the following described with greater detail. The first element (24) is provided with a plate radially developing outside with respect to the axis of the pin itself. The plate is provided with a first hole (25). The second element is provided with a second hole (31). The first elements (24) and the second elements (30) being configured and structured so that:

in the position in which the two third closing means (3,4) close simultaneously first entry branch (14) and first exit branch (22), the first hole (25) of the first element (24) plugging on the first pin (5) and the first hole (25) of the first element (24) plugging on the second pin (6) are in a first condition of reciprocal alignment (FIG. 12);

in the position in which the two third closing means (3,4) simultaneously close second entry branch (15) and second exit branch (23), the first hole (25) of the first element (24) plugging on the first pin (5) and the first hole (25) of the first element (24) plugging on the second pin (6) are in a second condition of reciprocal alignment (FIG. 11);

in the position in which the two third closing means (3,4) simultaneously open first entry branch (14), first exit branch (22), second entry branch (15), second exit branch (23), the second hole (31) of the second element (30) plugging on the first pin (5) and the second hole (31) of the second element (30) plugging on the second pin (6) are in a condition of reciprocal alignment (FIG. 10).

In this way a rod (26) inserted in the first holes (25) or in the second holes (31) blocks the rotation of first pin (5) and second pin (6) locking them in the set position and, therefore, it blocks the tabs (3,4) in the corresponding position. In this way it is also avoided that the operator that carries out the intervention may leave, even only temporarily, the valve in a condition in which a tab closes a first branch in correspondence with the respective entry or exit while the other tab closes the other branch in correspondence with the respective entry or exit, thus preventing the valve from working correctly. With the described system, instead, the operator will be lead to position the tabs correctly in order to be able to apply the rod in the corresponding holes obtained on the first elements and on the second elements.

Preferably (FIG. 10, FIG. 11, FIG. 12) it is provided that the rod (26) can be provided in correspondence with one end of a protrusion (27) having a dimension in section higher than the diameter of first hole (25) and second hole (31) and in correspondence with the other end the rod is provided with a seat (28) intended for the application of a locking element (29). In this way the end of said rod (26) which is provided with this seat (28) will be intended to be inserted within the first holes (25) or within the second holes (31) with no obstacles until it reaches a condition in which the protrusion (27) is in an abutment condition with the edge of the corresponding insertion hole preventing the rod from slipping. In this condition the opposite end of the rod, namely the one on which is obtained the seat (28) is protruded with respect to the corresponding insertion hole. Applying the locking element (29) is precluded the extraction of the rod (26) from the first holes (25) or from the second holes (31) and the rod is thus blocked within a couple of holes on the one hand by means of the protrusion (27) and the other hand by means of the blocking element (29). Preferably the blocking element is a padlock, so that only the operator endowed with corresponding key can operate on the valves for their maintenance, further increasing the security of the fire extinguishing system.

Advantageously, therefore, the valve is provided with a system with tabs incorporated inside the valve body that allows, when required, to insulate alternatively one of the two chambers. The system is consists of the two semi-cylindrical tabs placed in entry and exit from the valve. This system, with the closure of the valve in the hydraulic connecting line between the two trim lines, allows to carry out the maintenance on half of the system maintaining in operation the deluge extinguishing system. Each chamber (16,17) is able to ensure the water delivery necessary to the extinguishing system, without penalizing its performances and the safety level. Each chamber (16,17) can therefore be seen as a by-pass system inside the valve body upon failure of the other chamber.

Moreover, to increase the reliability of the system, the two chambers (16,17) can be connected with two dedicated trim lines, each in turn controlled by a different control line. In the conditions of normal operation moreover the two trim lines are hydraulically interconnected, to allow each control line to be able to open both chambers.

Though in the form of embodiment shown is present only one tab in correspondence with the entry (20) and a single tab in correspondence with the exit (21), it will be evident that in a less preferred solution of the present invention four tabs can be provided, in which each tab is intended for the closure of one between first entry branch (14), second entry branch (15), first exit branch (22), second exit branch (23). This solution is considered included in the present invention though not shown and the expression "at least one tab" must be intended in the appended claims as referred also to the case in which the tabs intended for the entry or the tabs intended for the exit are respectively two entry tabs and two exit tabs for a total of four tabs.

Furthermore this invention relates also to a distribution system of a fluid that comprising at least one valve (1) according to the present invention and particularly refers also to a fire extinguishing system by distribution of a fluid that comprises at least one valve (1) according to the present invention.

The description of the present invention has been made with reference to the figures enclosed in a preferred embodiment, but it is evident that many possible alterations, changes and variants will be immediately clear to those skilled in the art of the sector in the light of the previous description. So, it should be stressed that the invention is not limited by the previous description, but contains all alterations, changes and variants in accordance with the appended claims.

NOMENCLATURE USED

With reference to the identification numbers reported in the enclosed figures, the following nomenclature has been used:
1. Valve
2. Body
3. First tab
4. Second tab
5. First pin or first hinging point
6. Second pin or second hinging point
7. First membrane or first closing means
8. Second membrane or second closing means
9. First closure
10. Second closure
11. First flange
12. Second flange
13. Liquid
14. First entry branch
15. Second entry branch
16. First chamber
17. Second chamber
18. First control
19. Second control
20. Entry
21. Exit
22. First exit branch
23. Second exit branch
24. First element or element with plate
25. First hole
26. Rod
27. Protrusion
28. Seat
29. Locking element
30. Second element
31. Second hole
32. Blocking means

The invention claimed is:

1. A valve apparatus comprising:
a body having a fluid inlet and a fluid outlet and a communication chamber between said fluid inlet and said fluid outlet, said communication chamber having a closure for occluding flow communication between said fluid inlet and said fluid outlet, said closure operable by a controller, said communication chamber divided into a first chamber and a second chamber by said closure, each of said first chamber and said second chamber being put into flow communication with said fluid inlet and said fluid outlet according to a parallel configuration in which said first chamber is connected to said fluid inlet by a first entry branch and in which said first chamber is connected to said fluid outlet by a first exit branch and in which said second chamber is connected to said fluid inlet by a second entry branch and in which said second chamber is connected to said fluid outlet by a second exit branch, said first chamber having a first closing element adapted to open and close flow, said second chamber having a second closing element adapted to open and close flow, said controller controlling said first and second closing elements; and
a third closing element adapted to close at least one branch between said first entry branch, said first exit branch, said second entry branch and said second exit branch, said third closing element operable by said controller, said third closing element comprising a first closing tab that is hinged at a first hinging point, said first closing tab being movable by said controller between a first position and a second position and third position, said first position closing said first entry branch while keeping said second entry branch open, said second position closing said second entry branch while keeping said first entry branch open, said third position simultaneously keeping said first exit branch and said second exit branch open.

2. The valve apparatus of claim 1, said first hinging point being on said body in location between said first chamber and said second chamber and between said first entry branch and said second entry branch, said first closing tab having a though-hole that receives a first pin inserted therein, said first pin constituting said first hinging point around which said first closing tab is rotated by said controller.

3. The valve apparatus of claim 2, said third closing element comprising:
a second closing tab hinged to a second hinging point, said second closing tab movable between a first position and a second position and a third position, said first position of said second closing tab closing said first exit branch while keeping said second exit branch open, said second position of said second closing tab closing said second exit branch while keeping said first exit branch open, said third position of said second closing tab simultaneously keeping said first exit branch and said second exit branch open.

4. The valve apparatus of claim 2, said second hinging point being connected to said body in a location between said first chamber and said second chamber and between said first exit branch and said second exit branch, said second closing tab having a through-hole receiving a second pin therein, said second pin constituting said second hinging point around which said second closing tab is rotated.

5. The valve apparatus of claim 1, at least one of said first, second and third closing elements being selected from the group consisting of a piston, a claplet, a throttle, a sluice, and a shutter.

6. The valve apparatus of claim 1, at least one of said first, second and third closing elements being an elastic membrane.

7. The valve apparatus of claim 6, said elastic membrane being deformable by application of pressure to one side of said elastic membrane such that said elastic membrane adheres to an inside wall of one of said first and second chambers so as to close flow communication in the chamber, a removal of the pressure to the one side of each elastic membrane removing the adherence of said elastic membrane to said inside wall so as to open flow communication.

8. The valve apparatus of claim 6, at least one of said first, second and third closing elements being a deluge valve for a fire-extinguishing fluid.

9. The valve apparatus of claim 1, said controller comprising a first control and a second control that are independent of each other, said first control controlling said first closing element, said second control controlling said second control element.

10. The valve apparatus of claim 9, said controller comprising a pair of operating devices that simultaneously operate in parallel to control said first and second controls.

11. The valve apparatus of claim 9, said first control being a first trim line, said second control being a second trim line, said first and second trim lines being controlled by a fire extinguishing system.

12. The valve apparatus of claim 11, said first trim line being reciprocally connected to said second trim line.

13. The valve apparatus of claim 1, said third closing element being manually controllable by a dedicated burglar-resistant operating key.

14. The valve apparatus of claim 4, further comprising:
a blocking element selectively blocking said third closing element in a condition corresponding to a closure of said first entry branch and said first exit branch, a closure of said second entry branch and said second exit branch, or an opening of said first entry branch and a first exit branch and a second entry branch and a second exit branch.

15. The valve apparatus of claim 12, said blocking element comprising a pair of first elements and a pair of second elements that are respectively plugged on said first pin and on said second pin, one of said pair of first elements and one of said pair of second elements plugging on said first pin and correspondence with said through-hole and protruding outwardly with respect to said body, another of said pair of first elements and another of said pair of second elements plugging on said second pin in correspondence with said through-hole and protruding outwardly with respect to said body, each couple including one of said pair of first elements and one of said pair of second elements being constrained to rotate with the respective pin and jointly with respect to the corresponding closing tab, the first element having a plate with a first hole, said second element having a second hole, said pair of first elements and said pair of second elements configured such that when said third closing element simultaneously closes said first entry branch and said first exit branch the first holes are in a first condition corresponding to a reciprocal alignment of the first holes, said pair of first elements and said pair of second elements configured that when said third closing element simultaneously closes said second entry branch and said second exit branch the first holes are in a second condition corresponding to a reciprocal alignment of the first holes, said pair of first elements and said pair of second elements configured such that when said third closing element simultaneously opens said first entry branch and said first exit branch and said second entry branch and said second exit branch the second holes are in a third condition corresponding to a reciprocal alignment of the first holes, a rod being inserted into either the first holes or the second holes so as to block a rotation of said first pin and said second and so as to lock said first and second pins in a set position.

16. The valve apparatus of claim 15, said rod having a protrusion at one in their of, said protrusion having a cross-sectional dimension that is greater than a diameter of said first hole and said second hole, said rod having a seat at an opposite end thereof, said seat adapted to receive a locking element, said opposite end of said rod being inserted through the first with holes and the second holes until said protrusion abut an edge of one of the holes.

17. The valve apparatus of claim 16, said locking element being a padlock.

18. A fluid distribution system comprising the valve apparatus of claim 1.

19. A fire extinguishing system comprising the valve apparatus of claim 1.

* * * * *